United States Patent [19]

Riolfo

[11] Patent Number: 4,849,922
[45] Date of Patent: Jul. 18, 1989

[54] CIRCUIT FOR COMPUTING THE QUANTIZED COEFFICIENT DISCRETE COSINE TRANSFORM OF DIGITAL SIGNAL SAMPLES

[75] Inventor: Benedetto Riolfo, Torino, Italy

[73] Assignee: Cselt - Centro Studi E Laboratori Telecomunicazioni Spa, Torino, Italy

[21] Appl. No.: 131,833

[22] Filed: Dec. 11, 1987

[30] Foreign Application Priority Data

Jan. 20, 1987 [IT] Italy ............................ 67032 A/87

[51] Int. Cl.$^4$ ............................................. G06F 7/38
[52] U.S. Cl. ................................................... 364/725
[58] Field of Search ................... 364/725, 726; 382/43

[56] References Cited

U.S. PATENT DOCUMENTS

| | | | |
|---|---|---|---|
| 4,196,448 | 4/1980 | Whitehouse et al. | 364/725 X |
| 4,293,920 | 10/1981 | Merola | 364/725 |
| 4,385,363 | 5/1983 | Widergren et al. | 364/725 |
| 4,449,194 | 5/1984 | Wilhelm | 364/725 |
| 4,675,836 | 6/1987 | Arnould et al. | 364/725 |
| 4,679,163 | 7/1987 | Arnould et al. | 364/725 |

OTHER PUBLICATIONS

Haralick, "A Storage Efficient Way to Implement the Discrete Cosine Transform", IEEE Trans. on Comp., Jul. 1976, pp. 764–765.

Hague, "A Two-Dimensional Fast Cosine Transform", IEEE Trans. on Acoustics, Speech, and Signal Processing, vol. ASSP-33, No. 6, 12/85, pp. 1532–1539.

Kamanger et al., "Fast Algorithms for the 2-D Discrete Cosine Transform", IEEE Trans. on Computers, vol. C-31, No. 9, Sep. 1982, pp. 899–906.

Primary Examiner—Gary V. Harkcom
Assistant Examiner—Tan V. Mai
Attorney, Agent, or Firm—Herbert Dubno

[57] ABSTRACT

The circuit consists of two parallel branches which perform multiplication and accumulation operations for the even and odd lines of the transform coefficient matrix. Each branch includes: an input circuit (SEM1, SOT1) whereby the contributions of the opposing index columns of the matrix may be added; a multiplication circuit (ERM, ORM) which performs multiplication operations for each matrix column by an addition and shifting operation for each matrix coefficient; and an accumulation circuit for the intermediate products of each matrix column.

15 Claims, 6 Drawing Sheets

CIRCUIT FOR COMPUTING THE QUANTIZED COEFFICIENT DISCRETE COSINE TRANSFORM OF DIGITAL SIGNAL SAMPLES

FIELD OF THE INVENTION

The present invention relates to digital signal coding. In particular, it relates to a circuit for computing the quantized coefficient discrete cosine transform of digital signal samples.

BACKGROUND OF THE INVENTION

Transform digital coding applied to blocks of one-, two-, and three-dimensional digital signal samples is widely used in all applications, e.g. video signal processing which requires spectral analysis, data compression, and reduction of original signal bandwidth.

The various types of transform coding are well known. They include the Hadamard or HCT (High Correlation Transform) types, which are based on extremely simple coefficients, and Fourier transform, which requires complicated floating point calculations. Yet other types include the Slant transform, which concerns optimal frequency spectrum energy distribution.

At the present time, however, the discrete cosine transform, referred to hereunder as the DCT transform, provides the best compromise between effective representation in the transform signal frequency spectrum and simplicity of construction in many applications, including video signal processing.

In the case of the N.N base one-dimensional DCT transform, the major advantage consists in the recurrence of its N real coefficients.

A number of DCT transform computational algorithms are used; some are based on its direct derivation from the Fourier transform, while others exploit coefficient recurrence. These algorithms all serve to reduce the number of multiplications by comparison with the total number of operations to be carried out (addition, accumulation, addressing, normalizing, rounding off and cut-off operations); this makes them particularly suitable for software applications whose major objective is to reduce the number of microinstruction cycles.

Of the several well-known N.N base one-dimensional DCT transform computational algorithms, that which provides the greatest reduction in the number of multiplications is the Fralick-Chen algorithm. This algorithm is described in the paper, "A fast computational algorithm for the discrete cosine transform", W. Chen, C. H. Smith, S. C. Fralick, IEEE Transactions on Communications, Vol. COM. 25, No. 11, September 1977, and requires a number of operations namely, $3N/2(\log N - 1) + 2$ additions and $N \log N - 3N/2 + 4$ multiplications.

For the N.N base two-dimensional DCT transform, on the other hand, it is possible to exploit the distributed property and apply the algorithms for the one-dimensional case, such as the Fralick-Chen algorithm, in the two orthogonal directions; in this way, the number of operations carried out would be 2N times the number required for the one-dimensional case.

There is, however, a 2-D transform computational algorithms which produces a further reduction in the number of operations. This algorithm is described in a paper by M. Vetterli, "Fast 2-D discrete cosine transform", IEEE ICASSP-1985, and requires an amount of operations equal to:

$(N.N/2) \log N + N.N/3 - 2N + 8/3$ additions and $(N.N.5/2) \log N + N.N/3 - 6N + 62/3$ multiplications Normally, however, the drastic reduction in the number of operations provided by these algorithms is accompanied by a corresponding complication in handling and re-ordering intermediate product data, which produces serious memory addressing problems in designing computation circuits for these algorithms. Moreover, the non-uniform distribution in these ciruits of computational elements such as adders and multipliers which have different propagation times makes these components inefficient both as regards the reduction of overall computation time, and in terms of utilization of processing resources.

Irrespective of whether circuits for these algorithms are designed to use discrete or integrated components, the main problem is still the part of the circuit dedicated to multiplication operations.

This is because of the circuit complexity, elevated computation time, space occupation and power dissipation.

The best known application of N.N bit multiplication operation involves converting this operation into a sequence of N elementary N-bit adding and shifting operations. This solution has been used in parallel type multipliers with various circuit optimizations.

This solution would not appear to be the most efficient for the DCT transform, even if a limited number of cofficients must be used, given that the number of elementary operations to be performed is still high.

An attempt could be made to simplify the multiplier structure by using conversion tables employing ROM or PROM memories or programmed logic arrays (PLA) which contain the results of multiplications directly addressed by the operands.

In our case, however, such structures cannot be used because the large number of multiplication coefficients and of operand representation bits would require an excessively large memory capacity.

OBJECTS OF THE INVENTION

It is an object of the invention to provide DCT transform computation circuit which solves these problems and does not require multiplication computation or use multipliers.

Another object is to provide a DCT transform computation circuit with which it is possible to reduce space requirements, computing time and power dissipation.

SUMMARY OF THE INVENTION

By selecting a suitable order for transform matrix coefficients, and hence of operations to be performed, and by virtue of the type of precision (number of bits) adopted for representing coefficients, each multiplication according to the invention is performed by means of an addition and shifting operation which involves the sample to be transformed on input and/or the results of previous multiplications. In this way, the entire transformation operation is performed by computing $2NN(N-1)$ equivalent additions in the case of $N=16$, or $N.N(2N+1)$ equivalent additions in the case of $N=8$. Though the number of operations to be performed is thus drastically reduced, reordering the various intermediate products to be accumulated does not become more complicated, and creating accumulation memory addressing units also remains simple. This can be achieved using VLSI circuits.

Furthermore, the same circuit can be used to compute the DCT transform at any number of dimensions.

A circuit is provided in accordance with the invention for computing a discrete cosine transform of f(j) sample vectors of dimension $N(0<j<N-1)$, the transform having a square matrix base of dimensions N.N with coefficients which repeat in absolute value at each column but whose order (and in some cases sign) differ, the circuit obtaining transformed F(k) sample vectors, also of dimension $N(0<k<N-1)$. The circuit consists of two circuit branches working in parallel, the first for operations relating to coefficients in even matrix lines, the second for coefficient in odd lines.

The two branches consist essentially of:

a first adder and a first subtracter, belonging to the first and second branch respectively, which at inputs receive pairs of samples of an F(j) vector having index (j) and $(N-j-1)$, with j increasing sequentially from 0 to $NR-1$;

first and second calculating units, belonging to the first and second branch respectively, which, for each addition or subtraction result received respectively from the first adder or first subtracter, calculate NR partial products referring to the matrix column coefficients in even and odd lines respectively, with sequential order, among the coefficients of a column, fixed for all columns, so as to produce each partial product through an addition and shifting operation which involves the previous partial products and/or input datum;

a first and second adder/subtracter belonging respectively to the first and second branch, which add or subtract a partial product received from a second input to or from a datum received from a first input of first and second calculating units respectively, and finding the sum in the case of a partial product referring to a positive coefficient, or the difference in the case of a negative coefficient;

first and second memories, belonging to the first and second branch respectively, accumulating NR partial results each, for accumulating calculations performed by the first and second adder/subtracters, the first memories accumulating partial results $R^*(2k)$ relating to even matrix column lines, the second memories accumulating partial result $R^*(2k+1)$ relating to odd lines, the partial results being componentsof a transformed sample vector F(k) at the $NR-1$ index columns;

first addressing units which generate: first control signals for the first and second calculating units, the first control signals determining the sequential order, among coefficients of a column, fixed for all columns; addresses to be read in the first and second memories for accumulation of the partial results, supplied as data to the first input of first and second adder/subtracter respectively, and for rewriting them updated in the same position, the addresses having a sequence which varies with the matrix column, such as to identify the partial result $R^*(2k)$ and $R^*(2k+1)$ whose index corresponds to the matrix line containing the coefficient for which the first and second calculating units perform the partial products; operation selection signals for the first and second adder/subtracter.

For N=16, the first circuit units consist of:

a first and a second multiplexer which at a a first input receive output of the first adder and at a second input receive output of a first register;

first and second shifting units which receive outputs of the first and second multiplexer respectively; and a third adder/subtracter which receives outputs of the first and second shifting units, for subtraction subtracting the output of the second shifting units from that of the first shifting units, and whose output supplies the first register and is the output of the first circuit unit. In this case the second circuit units include:

a third and fourth multiplexers which at a first input receive output of the first subtracter, the third multiplexer receiving at a second input the output of a second register, the fourth multiplexer also receiving the outputs of a third and fourth register at a third and fourth input;

third and fourth shifting units which receive outputs of the third and fourth multiplexers respectively;

a fourth adder/subtracter which receives outputs of the third and fourth shifting units, for subtraction subtracting the output of the third shifting units from that of the fourth shifting units and whose output supplies the second, third and fourth registers and is the output of the second circuit units, the first, second, third and fourth registers being used for temporary storage of the previous partial products.

The first control signals generated by the first addressing units cause the following succession of operations to be performed by the first and second calculating units: for the first partial product, the first, second, third and fourth multiplexers are switched on the first input, the first, second, third and fourth shifting units shift respectively by four, one zero and three positions to the left, in the direction of multiplications by powers of two, the third and fourth adder/subtracter find the sum, the first and second registers memorize the input datum; for the second partial product the first, second, third and fourth multiplexers are switched respectively on the second, first, second, first input, the first, second, third and fourth shifting units shift respectively by one, zero, one and three positions to the left, the third and fourth adder/subtracters find the sum and the difference respectively, the third register memorizes the input data; for the third partial product the first, second, third and fourth multiplexers are switched on the second, first, second and third input, the first, second, third and fourth shifting units shift by zero, five, zero and one positions to the left, the third adder/subtracter finds the sum and the fourth the difference, the first and fourth registers memorize the input data; for the fourth partial product the first, second and fourth multiplexers are switched on the first input, the third multiplexer on the second input, the first, second, third and fourth shifting units shift by five, five, three and one position to the left, the third adder/subtracter finds the sum and the fourth the difference; for the fifth partial product the first and second multiplexers are switched on the second input, the third and fourth on the first input, the first shifting units shift by one position to the right in the direction of division by multiples of two, the third and fourth shifting units shift by six and four positions to the left, the third and fourth adder/subtracters find the sum, the second registers memorizes the input datum; for the sixth partial product the first, second, third and fourth multiplexers are switched on the second, first, second and third inputs, the first, second and fourth shifting units shift by one, four and one position to the left, the third shifting unit shifts by four positions to the right, the third adder/subtracter finds the difference and the fourth the sum; for the seventh partial product the first, second, third and fourth multiplexers are switched on the second, first and fourth inputs, the first shifting units shift by one position to the right, the second and fourth shifting units shift by six and one position to the left, the third and fourth adder/subtracters find the sum; for the eighth partial product, the first, second and third multiplexers are switched on the first input, the fourth on the third input, the first, second and third shifting units shift by five, five and six positions to the left, the third and fourth adder/subtracters find the sum.

For $N=16$, the first and second circuit units can include six and eight adders or subtracters respectively which produce an equal number of partial products through suitable justification of their two inputs, six and eighth registers which memorizes the results thereof, and further register on input of the first circuit units and multiplexers which receive the outputs of the registers, the first control signals generated by the addressing units determining only the connection sequence of multiplexer inputs with outputs.

The first circuit units can have the following interconnections between the adders or subtracters, intercalated with the registers; to a second adder is applied the output of the first adder shifted to the left by one and four positions; to a third adder are brought the outputs of the first adder, shifted by five positions to the left, and of the second adder; to a second subtracter are brought the outputs of the second adder, shifted by one position to the left, and of the first adder; to a third subtracter are brought the outputs of the first adder, shifted by four positions to the left, and of the third adder, shifted by one position to the left; to a fourth adder are connected to the outputs of the first adder, shifted by six positions to the left, and of the third adder, shifted by one position to the right; and to a fifth adder is applied the output of the third adder shifted by one position to the right at one input; the further register receives the output of the first adder shifted by six positions to the left.

In addition, the second circuit units have the following interconnection between the adders and subtracters, intercalated with the registers: to a sixth and seventh adder is applied the output of the first subtracter respectively shifted by six and four positions to the left and by three and zero positions to the left; to an eighth adder are brought the outputs of the first subtracter, shifted by three positions to the left, and of the seventh adder, shifted by one position to the left; to a fourth subtracter are brought the outputs of the first subtracter, shifted by one position to the left, and of the seventh adder, shifted by three positions to the left; to a fifth subtracter are applied the outputs of the seventh adder and the eight adder, shifted by one position to the left; to a ninth adder are brought the outputs of the first subtracter, shifted by six positions to the left, and of the eighth adder: to a tenth adder are applied the outputs of the sixth adder, shifted by four positions to the right and of the eighth adder, shifted by one position to the left; to an eleventh adder are brought the outputs of the first subtracter, and of the fifth subtracter, shifted by one position to the left; the output multiplexers connecting inputs to outputs in the following order: for the first partial product, the outputs of the second and seventh adder; for the second partial product, the outputs of the second subtracter and the eighth adder; for the third partial product, the outputs of the third adder and the fifth subtracter; for the fourth partial product, the outputs of the further register and the fourth subtracter; for the fifth partial product, the outputs of the fifth and sixth adder; for the sixth partial product, the outputs of the third subtracter and the tenth adder; for the seventh partial product, the outputs of the fourth and eleventh adder; and for the eighth partial product, the outputs of the further register and the ninth adder.

For $N=8$, the first circuit units can include:
a fifth and a sixth multiplexer who receive at a first input output of the first adder, at a second input output of a fifth register; the sixth multiplexer receiving at a third input output of a sixth register shifted by one position to the left, and with the outputs applied to its first ans second inputs shifted by three positions to the left;
fifth scaling units which receive output of the fifth multiplexer; and
a sixth subtracter which subtracts the output of the fifth shifting units from that of the sixth multiplexer, and whose output supplies the fifth and sixth registers and is the output of the first circuit units.

The second circuit units include:
a seventh and an eighth multiplexer which receive at a first input output of the first subtracter, and at a second input outputs of a seventh and an eight register respectively;
sixth and seventh shifting units which receive respectively the outputs of the seventh and eight multiplexers; and
a sixth adder/subtracter which receives the outputs of the sixth and seventh shifting units, for subtraction subtracting the output of the sixth shifting units from that of the seventh, and whose output supplies the seventh and eighth registers and is the output of the second circuit units; the fifth, sixth, seventh, eighth registers being used for temporary storage of the previous partial products.

In this case, the first control signals generated by the addressing units cause the following succession of operations on the part of the first and second calculating units: for the first partial product, the fifth, sixth, seventh and eighth multiplexers are switched on the first input, the fifth, sixth, and seventh shifting units shift by zero, zero and three positions to the left, the sixth adder/subtracter performs subtraction, the fifth and seventh registers memorize the input datum; for the second partial product, the fifth, sixth, seventh multiplexers are switched on the second input, the eighth multiplexer on the first input, the fifth, sixth and seventh shifting units shift by zero, zero and five positions, the sixth adder/subtracter performs subtraction, the sixth and eighth registers memorize the input datum; for the third partial product, the fifth, sixth, seventh and eight multiplexers are switched respectively on the second, third, second and fifth inputs, the fifth, sixth and seventh shifting units shift by zero, zero and six positions to the left, the sixth adder/subtracter finds the sum; for the fourth partial product, the fifth, sixth, seventh and eighth multiplexers are switched respectively on the second, third, second and second inputs, the fifth, sixth and seventh shifting units shift by zero, three and one position to the left, the sixth adder/subtracter finds the sum, the seventh register memorizes the input datum; for the fifth partial product, the fifth, sixth, seventh and eighth multiplexers are switched on the first, third, first and first input, the fifth, sixth and seventh shifting units shift by six, one and seven positions to the left, and the sixth adder/subtracter performs subtraction.

For N=8, the first and second circuit units can include respectively four and five adders or subtracters which produce an equal number of partial products through suitable justification of their two inputs, four and five registers which memorize the results thereof, and an output multiplexer which receives the outputs of the registers, the first control signals generated by the addressing units determining only the connection sequence of multiplexer inputs with outputs.

In the latter case, the first circuit units have the following interconnection between the adders or subtracters, intercalated with the registers: to a seventh subtracter is applied the output of the first adder shifted by three positions to the left at one input; to an eight subtracter is applied the output of the seventh subtracter shifted at an input by three positions; to a ninth subtracter are applied the outputs of the seventh subtracter, and the eighth subtracter scaled by one position to the left; and to a tenth subtracter are brought the outputs of the first adder, shifted by six positions to the left, and of the ninth subtracter shifted by one position to the left. The second circuit units can then have the following interconnection between the adders or subtracters, intercalated with the registers: to an eleventh and twelfth subtracter is applied the output of the first subtracter respectively shifted by three, zero, seven and one position to the left; to a thirteenth subtracter are applied the outputs of the first adder, shifted by five positions to the left, and the eleventh subtracter; to a twelfth adder are applied the outputs of the first subtracter, shifted by six positions to the left, and of the eleventh subtracter; to a thirteenth subtracter are applied the outputs of the eleventh subtracter shifted by three positions to the left, and of the thirteenth subtracter, shifted by one position to the left; the output multiplexer connecting inputs to outputs in the following order: for the first partial product, the outputs of the eighth and thirteenth subtracters; for the second partial product, the outputs of the ninth subtracter and the twelfth adder; for the third partial product, the outputs of the ninth subtracter and the thirteenth adder; and for the fourth partial product, the outputs of the tenth and twelfth subtracter.

The first addressing units supply to the outside a data-ready (DR) signal at the beginning of the operations relating to the NR−1 index column; on the basis of the signal, the partial results R*(k) at the outputs of the first and second adder/subtracters are available at outputs as components of a transformed F(k) sample vector.

These first addressing units (ADR2) supply, at the end of calculations relating to the index NR−1 column, addresses to the first and second accumulation memories for sequential reading and forwarding to the outputs of R*(k) partial results, there memorized, as components of a transformed F(k) sample vector.

The data at the outputs of the first adder, first subtracter, first and second calculating units and first and second accumulation memories are synchronized by registers.

The shifting units can consist of barrel shifters.

The two-dimensional discrete cosine transform circuits can include a first of the circuits followed by a matrix-structured intermediate memory and by a second of such circuits, and second addressing units for the intermediate memory which determine writing of N vectors of transformed F(k) samples, calculated by the first circuit, and reading in a direction orthogonal to that of writing, of N vectors of f(j) samples to be transformed, each consisting for the K-nth component of the F(k) vectors present in the intermediate memory, for forwarding to the second circuit (DCT2).

BRIEF DESCRIPTION OF THE DRAWING

The characteristics of the invention will be clarified by the following description of an embodiment thereof and of several multiplication circuit variants. Examples are not intended to be exhaustive, and refer to the accompanying drawing, in which.

SPECIFIC DESCRIPTION

Before describing the figures, a brief theoretical justification of the results obtained in circuit terms will be given.

The one-dimensional DCT transform of the discrete function f(j), with j=0, 1, ..., N−1 is defined as follows:

$$F(k) = \frac{2}{N} c(k) \sum_{j=0}^{N-1} f(j) \cos\left[\frac{\pi}{2N}(2j+1)k\right] \quad (1)$$

k=0, 1, ..., N−1
where:
$c(k) = 1/\sqrt{2}$ for k=0
=1 for k=1, 2, ..., N−1

The two-dimensional DCT transform of the discrete function
f(i,j), with i,j=0, 1, ..., N−1 is defined as follows:

$$F(k,\mathcal{X}) = \frac{4}{N^2} c(k)d(\mathcal{X}) \sum_{j=0}^{N-1} \cos\left[\frac{\pi}{2N}(2j+1)k\right] \sum_{i=0}^{N-1} f(i,j)\cos\left[\frac{\pi}{2N}(2i+1)\mathcal{X}\right] \quad (2)$$

k=0, 1, ..., N−1
$\mathcal{X}$=0, 1, ..., N−1
where:
$c(k) = 1/\sqrt{2}$ for k=0
=1 for k=1, 1, ..., N−1

$d(\mathcal{X}) = 1/\sqrt{2}$ for $\mathcal{X}$=0
=1 for $\mathcal{X}$=1, 2, ..., N−1

DCT transform coefficients in the two cases of base N=16 and N=8 are shown in Tables 1 and 2 below; coefficients are quantized at 8 bits, i.e. 7 mantissa bits and 1 sign bit:

TABLE 1

DCT transform with base N = 16

| 4 | 64 | 64 | 64 | 64 | 64 | 64 | 64 | 64 | 64 | 64 | 64 | 64 | 64 | 64 | 64 |
|---|----|----|----|----|----|----|----|----|----|----|----|----|----|----|----|
| 90 | 87 | 80 | 70 | 57 | 43 | 26 | 9 | −9 | −26 | −43 | −57 | −70 | −80 | −87 | −90 |
| 89 | 75 | 50 | 18 | −18 | −50 | −75 | −89 | −89 | −75 | −50 | −18 | 18 | 50 | 75 | 89 |
| 87 | 57 | 9 | −43 | −80 | −90 | −70 | −26 | 26 | 70 | 90 | 80 | 43 | −9 | −57 | −87 |
| 84 | 35 | −35 | −84 | −84 | −35 | 35 | 84 | 84 | 35 | −35 | −84 | −84 | −35 | 35 | 84 |
| 80 | 9 | −70 | −87 | −26 | 57 | 90 | 43 | −43 | −90 | −57 | 26 | 87 | 70 | −9 | −80 |
| 75 | −18 | −89 | −50 | 50 | 89 | 18 | −75 | −75 | 18 | 89 | 50 | −50 | −89 | −18 | 75 |
| 70 | −43 | −87 | 9 | 90 | 26 | −80 | −57 | 57 | 80 | −26 | −90 | −9 | 87 | 43 | −70 |
| 64 | −64 | −64 | 64 | 64 | −64 | −64 | 64 | 64 | −64 | −64 | 64 | 64 | −64 | −64 | 64 |
| 57 | −80 | −26 | 90 | −9 | −87 | 43 | 70 | −70 | −43 | 87 | 9 | −90 | 26 | 80 | −57 |
| 50 | −89 | 18 | 75 | −75 | −18 | 89 | −50 | −50 | 89 | −18 | −75 | 75 | 18 | −89 | 50 |
| 43 | −90 | 57 | 26 | −87 | 70 | 9 | −80 | 80 | −9 | −70 | 87 | −26 | −57 | 90 | −43 |
| 35 | −84 | 84 | −35 | −35 | 84 | −84 | 35 | 35 | −84 | 84 | −35 | −35 | 84 | −84 | 35 |
| 26 | −70 | 90 | −80 | 43 | 9 | −57 | 87 | −87 | 57 | −9 | −43 | 80 | −90 | 70 | −26 |
| 18 | −50 | 75 | −89 | 89 | −75 | 50 | −18 | −18 | 50 | −75 | 89 | −89 | 75 | −50 | 18 |
| 9 | −26 | 43 | −57 | 70 | −80 | 87 | −90 | 90 | −87 | 80 | −70 | 57 | −43 | 26 | −9 |

TABLE 2

DCT transform with base N = 8

| 91 | 91 | 91 | 91 | 91 | 91 | 91 | 91 |
|----|----|----|----|----|----|----|----|
| 126 | 106 | 71 | 25 | −25 | −71 | −106 | −126 |
| 118 | 49 | −49 | −118 | −118 | −49 | 49 | 118 |
| 106 | −25 | −126 | −71 | 71 | 126 | 25 | −106 |
| 91 | −91 | −91 | 91 | 91 | −91 | −91 | 91 |
| 71 | −126 | 25 | 106 | −106 | −25 | 126 | −71 |
| 49 | −118 | 118 | −49 | −49 | 118 | −118 | 49 |
| 25 | −71 | 106 | −126 | 126 | −106 | 71 | −25 |

Table 2-DCT transform with base N=8

It will be see from Tables 1 and 2 that there are several recurrent positive or negative coefficient values which repeat by column with a different order and with a principle horizontal pseudo-specularity which can be exploited to reduce the number of operations to be performed by half, carrying out a preliminary addition or subtraction on samples opposite to the input sample vector f(j) in accordance with the following convention:

f(j)+f(N−j−1) where j is even f(j)−f(N−j−1) where j is odd.

I have found that each coefficient of a column can be obtained from the preceding coefficients by means of a single addition and shifting operation, keeping the odd matrix lines separate from the even lines at all times; the first coefficient of both even and odd lines is broken down in a sum of two power-of-two values.

A possible non-limiting example of said coefficient breakdown for N=16 is as follows:

TABLE 3

| 9 = 8 + 1 | 18 = 16 + 2 |
| 26 = 9 × 2 + 8 | 35 = 18 × 2 − 1 |
| 43 = 26 × 2 − 9 | 50 = 18 + 32 |
| −70 = −9 × 8 + 2 | 64 = 32 + 32 |
| 80 = 64 + 16 | 75 = 50/2 + 50 |
| 57 = 26 × 2 + 80/16 | 84 = 50 × 2 − 16 |
| 87 = 43 × 2 + 1 | 89 = 50/2 + 64 |
| 90 = 26 + 64 | 64 = 32 + 32 |

TABLE 3

As will be seen, then, the most important aspect of this breakdown is that performin a multiplication operation between a f(j) signal sample to be transformed and a matrix coefficient will at worst require one addition and two shiftings (in the case of coefficient 57) between terms obtained in the previous step. As a shifting can be performed instantaneously through a suitable operand justification, it can be demonstrated that the entire transformation algorithm can be reduced to computing N.N.N additions and N.N.(N−2) accumulations or, in other words, around 2NN(N−1) equivalent additions.

Coefficient 70 is taken with a negative sign for reasons which will be clarified later.

Another non-limiting example of said coefficient breakdown applied to base N=8 is as follows:

TABLE 4

| 7 = 8 − 1 | 7 = 8 − 1 |
| 25 = 32 − 7 | 49 = 7 × 8 − 7 |
| 71 = 64 + 7 | 91 = 49 × 2 − 7 |
| 106 = 25 × 2 + 7 × 8 | 91 = 49 × 2 − 7 |
| 126 = 128 − 2 | 118 = 91 × 2 − 64 |

TABLE 4

This case requires an initial breakdown in multiples of 7, which are in turn divided into power-of-2 factors; the total number of equivalent additions to be performed is equal to N.N.(2N+1), which would seem to be greater than the previous case of base N=16, but is in practice smaller because the value of N is lower.

The transformation algorithms for the one-dimensional case consists in computing the matrix product of a sequence of N-component column vectors (representing the sequence of input signals to be transformed) and the transform coefficient matrix of dimensions N.N, obtaining another N-component column vector: with the known circuits discussed above, this is generally carried out by multiplying and accumulating each input vector component by all terms of the corresponding matrix line, moving sequentially by line inside the matrix.

Instead, I have utilized the relations between the various matrix coefficients defined above to develop a circuit of relatively simple structure which computes said matrix product with a different ordering of the various intermediate products, moving by column inside the matrix. For each column, in other words, N partial contributions are computed and accumulated for the N column coefficients, but the N coefficients are always addressed in the same double succession shown in Table 3 or 4 in order to exploit the relationship defined above between the various coefficients. Only one half of the columns is considered, as the other half is specular.

On the other hand, a memory with a capacity of N words is required for temporarily storage of intermediate accumulations, as all partial contributions of each f(k) component must be computed simultaneously for each f(j) input sample. Moreover, the two-dimensional transform requires a further N.N word capacity memory between the two orthogonal transformation processes, as the second transform step must be applied to the N vectors transposed for the one-dimensional case.

The size of each word is (log N+Nb+Ns) bits, where log N may be 4 or 3, Nb is in our case equal to 8 and is the precision of the coefficients, and Ns is the precision of the input samples.

As for reordering the various intermediate products to be accumulated, this type of approach permits easy address generation and management, so that further complications do not arise in developing the internal addressing unit of the circuit.

Figure 1:
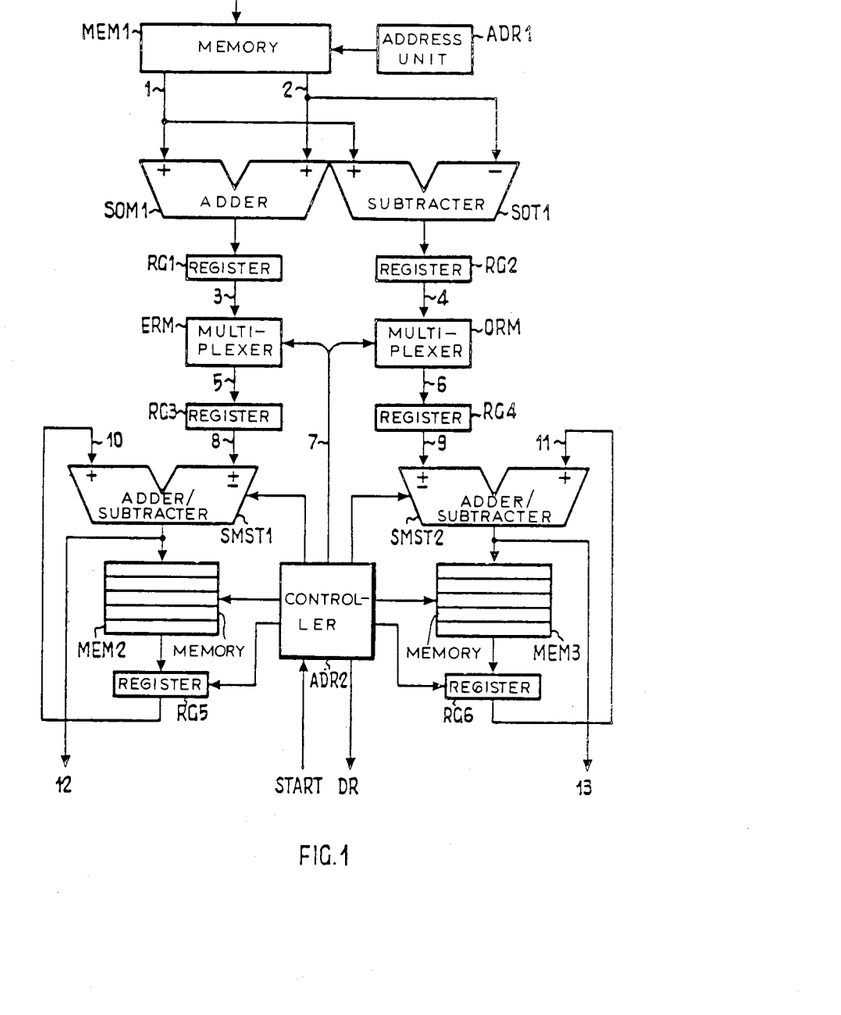
FIG. 1 is a block diagram of the one-dimensional DCT transform computational circuit described herein.

FIG. 1 is a block diagram of the one-dimensional transform computational circuit valid for both N=16 and N=8.

MEM1 is a memory in which are written the N vector components of the f(j) samples to be transformed; said components are addressed during reading by an addressing unit ADR1 so that output buses 1 and 2 simultaneously hold components of index f(j) and f(N−j−1) respectively, with j increasing sequentially from 0 to (N/2−1).

SOM1 is a normal adder for MEM1 outputs 1 and 2, while SOT1 is a normal subtracter which subtracts MEM1 output 2 from output 1.

Registers RG1 and RG2 are two normal registers for temporary storage of outputs of SOM1 and SOT1 respectively.

ERM and ORM are two crcuits capable of pseudo-multiplying input sample vector components by transformation matrix coefficients in accordance with this invention; ERM is used for the even lines of the matrix and receives samples from RG1 output 3, while ORM is used for odd lines and receives samples from RG2 output 4.

Possible embodiments of ERM and ORM will be examined below. RG3 and RG4 are two normal registers for temporary storage of results of operations carried out by circuits ERM and ORM, respectively available on outputs 5 and 6 of said circuits. RG3 supplies data on output 8, and RG4 on output 9.

SMST1 and SMST2 are normal adder/subtractors which add input 8 to input 10 and input 9 to input 11, or subtract input 8 from 10 and 9 from 11.

Choice of operations is controlled by block ADR2: the sum is performed at the positive coefficients of the transform, while subtraction takes place at the negative coefficients.

MEM2 and MEM3 are two memories for accumulating the partial results R(k) of the sum/subtractions performed by SMST1 and SMST2.

MEM2 memorizes N/2 partial results R(2k) relating to contributions of even coefficient matrix lines, while MEM3 memorizes N/2 partial results R(2k+1) of the odd lines (0≦k≦N/2−1).

MEM2 and MEM3 are line-structured, with one line for each index k.

RG5 and RG6 are two registers for temporarystorage of partial results R(2 K) and R(2k+1) read in memories MEM2 and MEM3 respectively. During transform computation, the various partial results are present at outputs 10 and 11 of RG5 and RG6. At the end of computation, the N components of transform vector F(k) are present at outputs 12 and 13, and are divided into even index components F(2k) at output 12 and odd index components F(2k+1) at output 13.

ADR2 is an address generating block which reads and writes memories MEM2 and MEM3, command signals for operations performed by blocks ERM and ORM, SMST1 and SMST2 operation selection signals and RG5 and RG6 output selection signals.

For each column of the transform coefficient matrix, ADR2 always supplies the same succession of command signals to blocks ERM and ORM to perform the sequence of operations shown as an example in Tables 3 and 4. Items which change as a function of matrix column include control of the operation performed by SMST1 and SMST2, and addressing of memories MEM2 and MEM3 by ADR2 in order to read partial results R(2k) and R(2k+1) of suitable index k.

This is necessary because of the different location of coefficients of equal absolute value in the various matrix columns.

The MEM2 and MEM3 address reading sequence generated by ADR2 can be deduced easily from Tables 1, 2, 3 and 4 on the basis of the following considerations.

The circuit shown in FIG. 1 is divided into two branches, relating respectively to the even and odd lines of the coefficient matrix; the branches work simultaneously.

ADR2 thus simultaneously addresses pairs of partial results, one in MEM2 and one in MEM3.

In both caes of N=16 and N=8 in associated Tables 1 or 2, the top left end is taken as the origin (column 0, line 0). For each column m(0≦m≦N/2−1), ADR2 addresses MEM2 and MEM3 positions of line index n(0≦n≦N−1) such that the same succession of coefficients indicated in Table 3 or 4 is always produced.

In these Tables, the left-hand succession (9, 26, ..., or 7, 25, 71, ...) always relates to odd lines, while the right-hand succession (18, 35, ..., or 7, 49, 91, ...) always relates to even lines.

As for the accumulations relating to the last index N/2−1 column, data at outputs 12 and 13 are already the final results of the transformation operation, but are in an unordered double sequence, i.e., with variable index k, which depends on the particular order of Table 3 or 4 sequence coefficients in the (N/2−1) column of Table 1 or 2.

Consequently, if the primary intention is to minimize the delay with which the circuit computes the transform, the last memorization of results in MEM2 and MEM3 can be avoided, and these results can be made available on outputs 12 and 13 by means of a data-ready signal DR supplied by ADR2 at the beginning of the last series of SMST1 and SMST2 calculations relating to the (N/2−1)th column.

In this case, an external addressing unit downstream of the circuit shown in FIG. 1 will be assigned the task of ordering results correctly.

Conversely, if it is more important to obtain a correctly ordered sequence of results (with k increasing linearly) at the outputs of the circuit shown in FIG. 1, the computation results relating to the last column are still memorized in MEM2 and MEM3.

ADR2 then supplies the data-ready signal DR and addresses MEM2 and MEM3 in alternating sequence so as to provide the ordered sequence of N transform vector F(k) components at outputs 12 and 13.

Controller ADR2, as far as address generation for MEM2 and MEM3 is concerned, may consist of two counters, one for MEM2 and one for MEM3, which count in sequence from 0 to N/2−1 for each matrix column, followed by a combinatory logic which suitably changes bit justification at counter output in relation to the value of m(i.e., of the column).

Alternatively, controller ADR2 may consist of a matrix-structured memory addressed sequentially in increasing order, first by column and then by line, and in which the pair of N values used to address MEM2 and MEM3 is written in every position.

Neither embodiment of controller ADR2 is a problem for technicians in the field, given the data description provided here.

Though not shown in the figure, an external synchronizing unit of standard type, which again will present no problems to the technician, is provided to supply a clock signal to the various sequential circuits and to the ADR2 block. In addition, this unit provides controller ADR2 with a start signal for computing an input sample vector f(j).

In FIG. 1, blocks MEM1 and ADR1 are not an essential part of the DCT transform computational circuit, but represent a possible example of how the double sequence of f(j) vectors on inputs 1 and 2 can be achieved.

If the circuit shown in FIG. 1 is set up using an integrated structure, it is advisable to confine these blocks outside of the integrated circuit. This is partly because they might be part of existing circuits and techniques used will thus depend on the specific case in hand. Care should be taken, however, to obtain the particular sequence of vector f(j) components described above at inputs 1 and 2.

Figure 2:
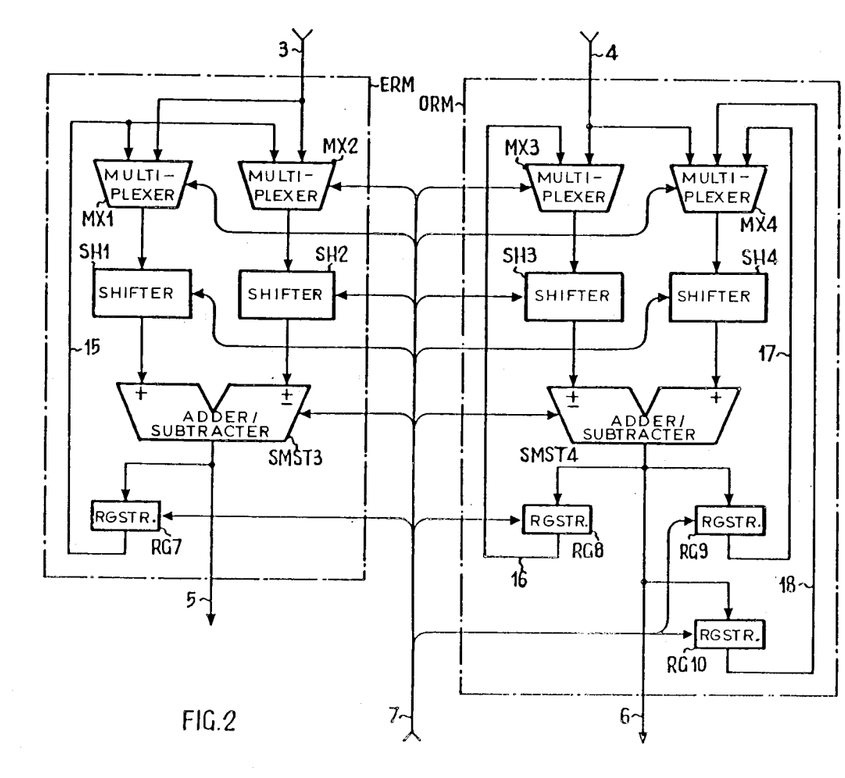
FIGS. 2, 3, 4 and 5 show embodiments of the ERM and ORM blocks of FIG. 1, which perform multiplication operations.

FIG. 2 shows a first example of an embodiment of blocks ERM and ORM, indicated with a chain line, for N=8.

ERM consists of circuit blocks MX1, MX2, SH1, SH2, SMST3 and RG7, while ORM consists of circuit blocks MX3, MX4, SH3, SH4, SMST4, RG8, RG9 and RG10.

MX1 and MX2 are two normal multiplexers, each of which receives output 3 of register RG1 (FIG. 1) and output 15 of register RG7.

Shifter SH1 and SH2 are two circuits which shift a given variable number of input positions of the data applied to their input. Shifter SH1 receives the multiplexer MX1 output, while shifter SH2 receives the multiplexer MX2 output.

SH1 and SH2 are barrel shifter circuits, consisting of a battery of multiplexers which shift a variable number of input positions in a brief, fixed period (which is the average data propagation time through their structure). The number of shift positions is determined by the bit combination applied to their control input. These circuits are used instead of normal shift registers because of their greater shifting speed.

Outputs of shifters SH1 and SH2 are brought to a normal adder/subtracter SMST3, which adds the inputs or subtracts the shifter SH2 output from the shifter S1 output.

The output of adder/subtracter SMST3 is output 5 of the ERM block, as well as the input of normal register RG7 which memorizes input data upon receiving a loading signal from connection 7, and whose data output 15 is connected to the inputs of multilexers MX1 and MX2.

ORM block structure is similar to that of ERM, and consists of two multiplexers MX3 and MX4 followed by two barrel-shifters SH3 and SH4 which supplyan adder-subtracter SMST4; the latter adds inputs or subtracts the shifter SH3 output from the shifter SH4 output.

The output of adder/subtracter SMST4 is ORM output 6, as well as the input of normal registers RG8, RG9 and RG10 which memorize input data upon receiving a loading signal from connection 1.

The multiplexer MX3 receives the register RG2 output 4 (FIG. 1) and the register RG8 output 16, while the multiplexer MX4 receives the register RG9 outputs 4 and 17 and the register RG10 output 18.

The controller ADR2 (FIG. 1) supplies on connection 7 the input selection signals of multiplexers MX1, MX2, MX3 and MX4, the bit connections determining the extent of shifting carried out by shifters SH1, SH2, SH3 and SH4, the loading signals for registers RG4, RG8, RG9 and RG10, and the addition/subtraction selection signals for adder/subtracters SMST3 and SMST4. Composition of the part of controller ADR2 wich generates signals on connection 7 can be readily deduced from the following description of ERM and ORM block operation.

For each datum on inputs 3 and 4, the ERM block multiplies coefficients in the right-hand column of Table 3, while ORM multiplies coefficients in the left-hand column, proceeding from top to bottom of the table.

To multiply the input 3 datum by the first coefficient (18), multiplexers MX1 and MX2 are both switched on input 3; shifter SH1 shifts by four positions towards the left (multiplication by 16), while shifter SH2 shifts by 1 position (multiplication by 2); adder/subtracter SMST3 then adds, while the result of the multiplication by 18 is on output 5, and is also temporarily stored in register RG7 and serves for subsequent input 3 datum multiplication by the second and third coefficients (35 and 50). For the second coefficient (35), multiplexer MX1 is switched on input 15 by register RG7, and multiplexer MX2 on input 3; shifter SH1 shifts by 1 position to the left, shifter SH2 does not shift positions, and adder/subtracter SMST3 finds the difference. For the third coefficient (50), multiplexer MX1 is switched on input 15 and multiplexer MX2 on input 3; shifter S1 does not shift positions, while shifter SH2 shifts 5 positions to the left; and adder/subtracter SMST3 adds the two inputs and the esult is stored in RG7 in place of the preceding, as well as being available at output 5.

For the fourth coefficient (64), multiplexers MX1 and MX2 are switched on input 3; shifters SH1 and SH2 shift by five positions to the left, and SMST3 finds the sum.

For the fifth coefficient (75) multiplexers MX1 and MX2 are switched on input 15; shifter SH1 shifts by one position to the right (division by 2), while shifter SH2 does not shift positions; adder/subtracter SMST3 finds the sum of the inputs. For the sixth coefficient (84), multilexer MX1 is switched on input 15 and MX2 on input 3; shifter SH1 shifts by one position, shifter SH2 by four positions to the left; and adder/subtracter SMST3 finds the difference. For the seventh coefficient (89), multiplexer MX1 is switched on input 15, multiplexer MX2 on input 3; shifter SH1 shifts 1 position to the right, and shifter SH2 shifts 6 positions to the left, and SMST3 finds the sum.

For the eight coefficient (64), the same operations are carried out as for the fourth coefficient.

To multiply the input 4 datum by the first coefficient (9, first column in Table 3), multiplexers MX3 and MX4 are switched on input 4; shifter SH3 does not shift positions, shifter SH4 shifts by 3 positions to the left (multiplication by 8); adder/subtracter SMST4 finds the sum and the result, aside from being available at output 6, is also stored in register RG8 and serves for subsequent multiplication by the second, third and fourth coefficients (26, 43 and 70).

For the second coefficient (26), multiplexer MX4 is switched on input 4, multiplexer MX3 on input 16; shifter SH3 shifts by 1 position to the left, shifter SH4 shifts by 3 positions to the left; and adder/subtracter SMST4 finds the sum and the results is also stored in register RG9. For the third coefficient (43), multiplexer MX3 is switched on input 16, multiplexer MX4 on input 17; shifter SH3 does not shift positions; shifter SH4 shifts by one position to the left; and adder/subtracter SMST4 finds the difference and the result is stored in register RG10. For the fourth coefficient (−70), multiplexer MX4 is switched on input 4, multiplexer MX3 on input 16; shifter SH3 shifts by 3 positions to the left, shifter SH4 by 1 position to the left and adder/subtracter SMST4 finds the difference. The fourth coefficient is taken with a negative sign because otherwise it would be necessary to invert adder/subtracter SMST4 inputs, unnecessarily complicating the circuit. However, the correct sign of the product computed by multiplexer ORM is restored by a suitable add or subtract command from adder/subtracter SMST2 (FIG. 1) without further burdening the circuit.

For the fifth coefficient (80), multiplexers MX3 and MX4 are switched on input 4; shifter SH3 and SH4 shift respectively by 4 ad 6 positions to the left; and adder/subtracter SMST4 finds the sum, and the result is stored in register RG8 in place of the preceding.

For the sixth coefficient (57), multiplexer MX3 is switched on input 16, multiplexer MX4 on input 17; shifter SH3 shifts by 4 positions to the right (division by 16), shifter SH4 by 1 position to the left, and adder/subtracter SMST4 finds the sum. For the seventh coefficient (87), multiplexer MX3 is switched on input 4, multiplexer MX4 on input 18; shifter SH3 does not shift positions. Shifter SH4 shifts by one position to the left, and adder/subtracter SMST4 finds the sum.

For the eight coefficient (90), multiplexer MX3 is switched on input 4; multiplexer MX4 on input 17; shifter SH3 shifts by 6 positions to the left, shifter SH4 does not shift positions; and adder/subtracter SMST4 finds the sum.

The two ERM and ORM blocks work simultaneously and thus perform a generic multiplication by means of two shiftings and an addition/subraction, as well as storing the result in one of the registers RG7, . . . , RG10 when necessary.

Figure 3:
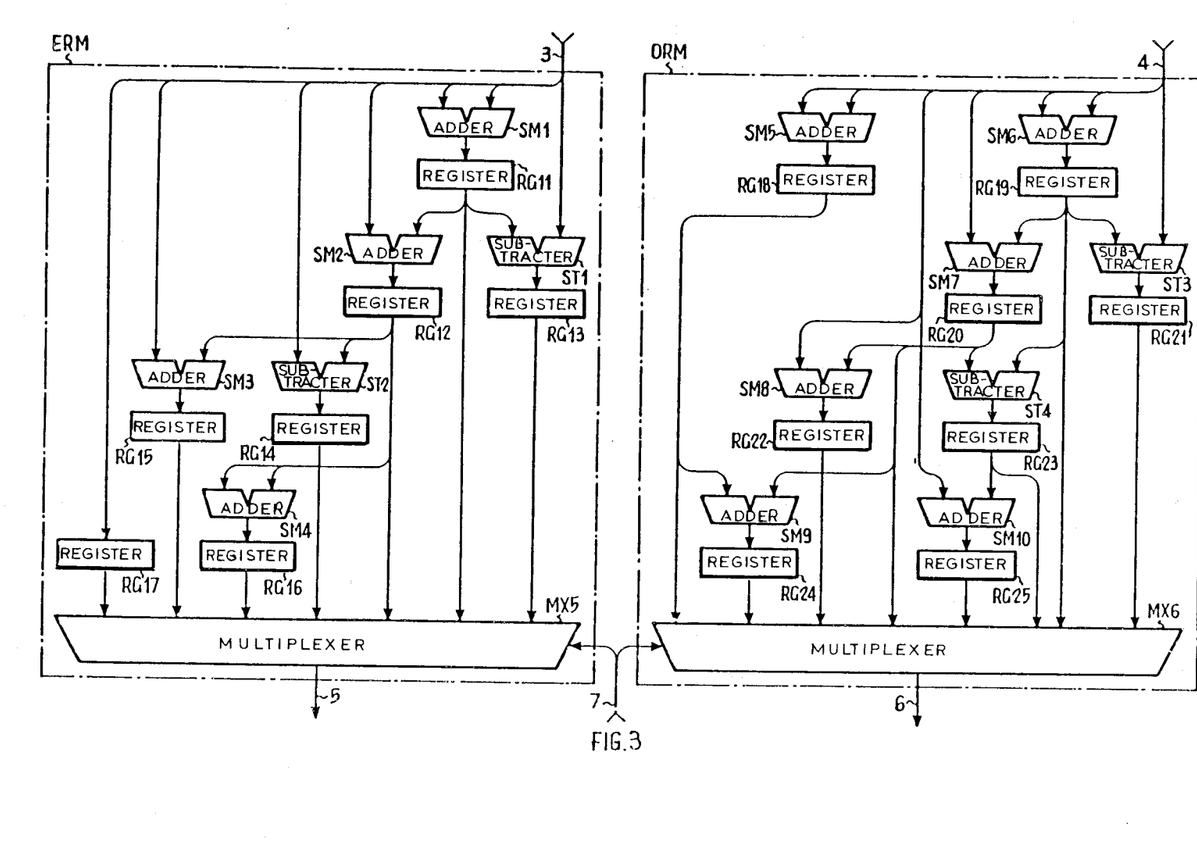

FIG. 3 shows a second example of an ERM and ORM multiplier, indicated by dot-dash lines, for N=16.

ERM and ORM consist of pairs of adders or subtractors and registers; each pair is dedicated to the product for a given Table 3 coefficient. Each register output is connected to an output multilexer and, where necessary, to the input of another adder or subtracter. Inputs of said adders or subtracters are suitably justified in order to produce the various multiplications or divisions by power of two appearing in Table 3.

The ADR2 block (FIG. 1) controls only the multiplexers so as to produce two successins of product results in accordance with the successions shown in Table 3. ERM produces the product succession for the right-hand column coefficients in Table 3, while ORM produces product succession for the left-hand column coefficient.

Taking the ERM block in greater detail, an adder SM1 multiplies the first coefficient (18) in the right hand column of Table 3, and register RG11 memorizes the result. SM1 receives RG1 register output 3 (FIG. 1) shifted by 4 positions to the left at the first input and by 1 position at the second input (multiplications by 16 and 2).

A subtractor ST1 multiplies the second coefficient (35), and register RG13 memorizes the result. ST1 subtracts output 3 applied to the first input from the RG11 output applied to the second input and shifted by one position to the left.

An adder SM2 multiplies the third coefficient (50), and register RG12 memorizes the result. SM2 receives output 3 shifted to the left by 5 positions and the output of register RG11.

A register RG17 multiplies the fourth and eight coefficient (64); in fact, it receives output 3 shifted by 6 positions.

An adder SM4 multiplies the fifth coefficient (75), and a register RG16 memorizes the result. Adder SM4 receives register RG12 output shifted by one position to the right (division by 2) at the first input, and unshifted at the second input.

A subtracter ST2 multiplies the sixth coefficient (84), and register RG14 memorizes the result. SM3 receives output 3 shifted by 6 positions to the left and the output of register RG12 shifted by 1 position to the right (division by 2).

The outputs of registers RG11, . . . , RG17 are brought to 7-input multiplexers MX5. Register RG17 output will be switched twice by multiplexer MX5 on output 5.

As for the ORM block, an adder SM6 multiplies the first coefficient (9) in the left-hand column of Table 3, a register RG19 memorizes the result. SM6 receives output 4 shifted by 3 positions to the left at the first input, and unshifted at the second input.

An adder SM7 multiplies the second coefficient (26), and register RG20 memorizes the result. Adder SM7 receives output 4 shifted by 3 positions to the left, and register RG19 output scaled by 1 position to the left.

A subtracter ST4 multiplies the third coefficient (43) and register RG23 memorizes the result. Subtracter ST4 subtracts register RG19 output from register RG20 output shifted by one position to the left.

A subtracter ST3 multiplies the fourth coefficient (−70) and register RG21 memorizes the result. ST3 subtracts register RG19 output shifted by 3 positions to the left from output 4 shifted by on position to the left. In this case, the coefficient sign makes no difference, as it does not influence circuit complication.

An adder SM5 multiplies the fifth coefficient (80) and register RG18 memorizes the result. SM5 receives output 4 shifted by 6 positions to the left at the first input, and by 4 positions to the left at the second input.

An adder SM9 multiplies the sixth coefficient (57) and register RG24 memorizes the result. SM9 receives register RG19 output shifted by 4 positions to the right (division by 16) and register RG20 output shifted by one position to the left.

An adder SM10 multiplies the seventh coefficient (87) and register RG25 memorizes the result. SM10 receives output 4 unshifted and register RG23 shifted by one position to the left.

An adder SM8 multiplies the eight coefficient (90) and register RG22 memorizes the result. SM8 receives output 4 scaled by six positions to the left, and register RG20 output unshifted.

Outputs of registers RG18, . . . , RG25 are brought to 8 input multiplexer MX6.

As previously stated, the addresser/controller ADR2 (FIG. 1) controls only multiplexers MX5 and MX6 by selecting, via connection 7 control signals, a suitable succession of input connections with outputs 5 and 6. It is not necessary to provide special loading commands for registers RG11, RG12, . . . RG25, as it is sufficient that data at their outputs be stable and correct at the time they are taken by multiplexers MX5 and MX6. Furthermore, data at register RG1 and RG2 outputs 3 and 4 (FIG. 1) remain fixed for the time required for circuits ERM and ORM to perform all calculations, i.e. the calcualtions relating to one transform coefficient matrix column. Consequently, it is sufficient to command register loading by means of the normal clock signal, which is brought to all circuit registers but is not shown in the figure for reasons of simplicity, and the various operation results propagate among the various cascade-connected register levels.

After the first clock signal pulse, outputs of first level registers RG11 (ERM block) and RG19 (ORM block) already hold a correct, stable dataum which is thus immediately communicated via multiplexers MX5 and MX6 on outputs 5 and 6, and so forth. Multiplexers MX5 and MX6 switching then follows clock signal cadence.

The embodiment shown in fIG. 3 calls for the use of a larger number of components (or of equivalent logic gates if integrated circuits are employed) than the example shown in FIG. 2, but permits higher computing speeds and simplifies addressing by the ADR2 block.

Figure 4:
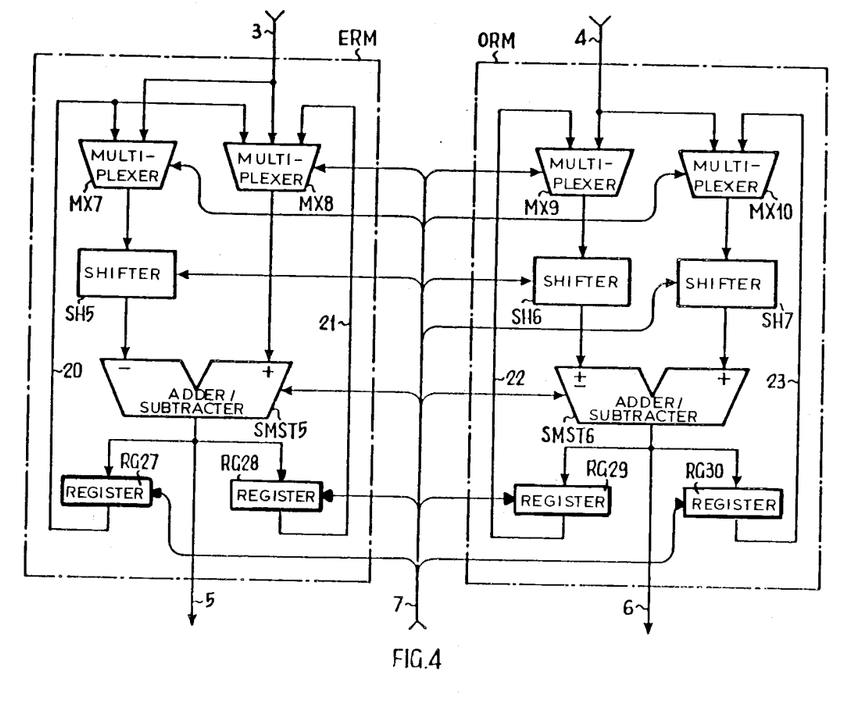

FIG. 4 shows a third embodiment of blocks ERM and ORM, indicated with dot-dash line, for N=8. As this circuit solution follows that shown in FIG. 2, the reader is directed to the description of said circuit for general considerations regarding components used, operation and ADR2 block control mode (FIG. 1).

For each datum at inputs 3 and 4, the ERM block performs multiplications by the coefficients in the right hand column in Table 4, while ORM multiplies by the coefficients in the left hand column, proceeding from top to bottom of Table 4.

The ERM block consists of two multiplexers MX7 and MX8, a barrel shifter SH5 downstream of MX4, a subtracter SMST5 which subtracts SH5 output from MX8 output, and two registers RG27 and RG28 which can memorize output 5 of SMST5. At its inputs, MX4 receives RG27 outputs 3 and 20; MX8 inuts reveice G27 outputs 3 and 20 and RG28 output 21.

Only one barrel shifter is necessary, as in order to obtain multiplications by powers of two of the first addend of the breakdowns shown in the right-hand column on Table 4, it is sufficient for multiplexer MX8 inputs to be suitably justified: output 21 of register RG28 is applied to an MX8 input shifted by one position to the left (multiplication by 2 of coefficient 49 and 91); register RG27 output 20 and RG1 output 3 (FIG. 1) are applied to MX8 shifted by three positions to the left (multiplication by 8 of coefficient 7 and the input datum).

To multiply the input 3 datum by the first coefficient (7), multiplexers MX7 and MX8 are switched on input 3; shifter SH5 does not shift positions; adder/subtracter SMST5 output is stored in register RG27 and is not accumulated in memory MEM2 (FIG. 1) because it is used only inside the ERM block.

For operations on the second coefficient (49), multiplexers MX7 and MX8 are switched on register RG27 output 20; shifter SH5 does not shift positions; adder/-subtracter SMST5 output is stored in register RG28 and is also taken from output 5 and accumulated in memory MEM2 (FIG. 1).

For operations on the third coefficient (91) multiplexer MX7 is switched on register RG27 output 20 and multiplexer MX8 is switched on regiser RG28 output 21, and shifter SH5 does not shift positions. The same cycle of operations is used for the fourth coefficient (91); at the end of the result of adder/subtracter SMST5 is also stored in register RG28.

For operations on the fifth coefficient (118), multiplexer MX7 is switched on output 3, multiplexer MX8 is switched on register RG28 output 21, and shifter SH5 shifts by 6 positions to the left (multiplication by 64).

The ORM block consists of two multiplexers MX9 and MX10 followed by two barrel-shifters SH6 and SH7 which feed an adder/subtracter SMST6 whose output 6 can also be stored in two registers RG29 and RG30. MX9 receives RG2 output 4 (FIG. 1) and register RG29 output 22, while multiplexer MX10 receives register RG30 outputs 4 and 33.

To multiply the input 4 datumby the first coefficient (7) in the left-hand column on Table 4, multiplexers MX9 and MX10 are switched on register RG1 output 4 (FIG. 1); shifter SH6 does not shift; shifter SH7 shifts by three positions to the left; adder/subtracter SMST6 subtracts shifter SH6 output from shifter SH7 output; and adder/subtracter SMST6 output is only stoed in RG29, and is not accumulated in memory MEM2 (FIG. 1) because it is used only inside the ORM block.

For operations on the second coefficient (25), multiplexer MX9 is switched on register RG29 output 22, multiplexer MX10 is switched onoutput 4; shifter SH6 does not shift, while shifter SH7 shifts by five positions; adder/subtracter SMST6 subtracts shifter SH6 output from shifter SH7 output; and the output is also stored in register RG30.

For operations on the third coefficient (71), multiplexer MX9 is switched on register RG29 output 22, multiplexer MX10 is switched on output 4; shifter SH6 does not shift, while shifter SH7 shifts by six positions; and adder/subtracter SMST6 adds the outputs of shifters SH6 and SH7.

For operations on the fourth coefficient (106), multiplexer MX9 is switched on RG9 output 22, multiplexer MX10 is switched on register RG10 output 23; shifter SH6 shifts by 3 positions to the left and SH7 by one, and adder/subtracter SMST6 adds the outputs of shifters SH6 and SH7.

For operations on the fifth coefficient (126), multiplexers MX9 and MX10 are switched on output 4; shifter SH6 shifts by one position and shifter SH7 by seven positions to the left, and adder/subtracters SMST6 subtracts shifter SH6 output from shifter SH7 output.

Figure 5:
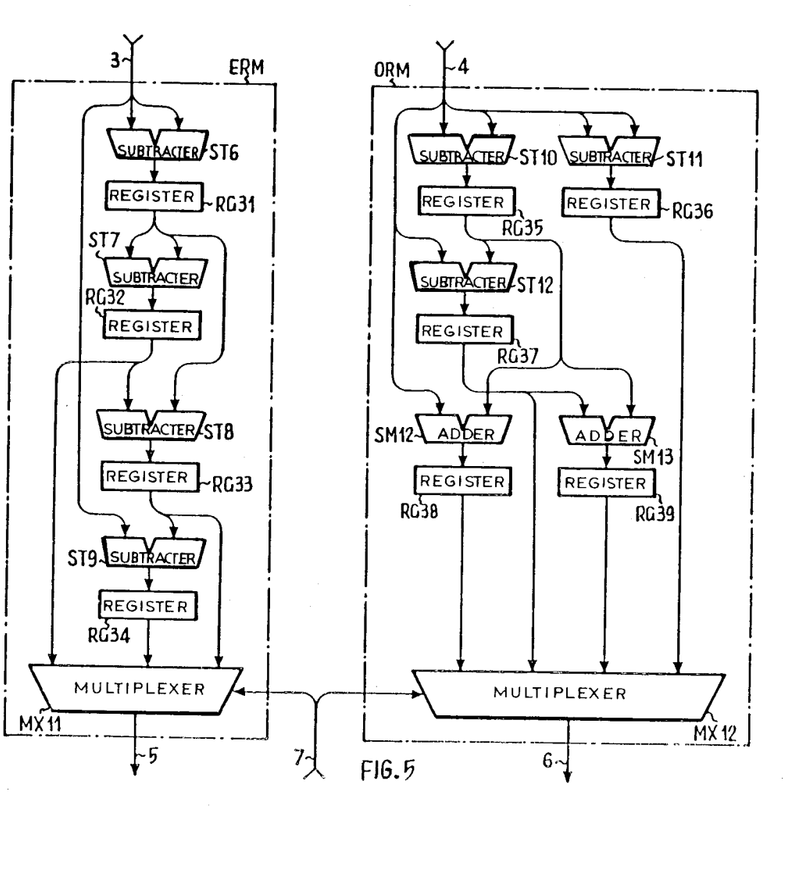

FIG. 5 shows a fourth embodiment of blocks ERM and ORM, indicated with a chai line, for N=8.

As this circuit solution follows that shown in FIG. 3, the reader is directed to the description of said circuit for general considerations regarding components used, operation and ADR2 block control mode (FIG. 1).

For each datum at inputs 3 and 4, the ERM block performs multiplications by the coefficients in the right hand column on Table 4, while ORM multiplies by the coefficients in the left hand column of the Table.

In the ERM block, a subtracter ST6 multiplies the datum on register RG1 output 3 (FIG. 1) by the first coefficient (7), in the righthand column on Table 4, and the result is stored in register RG31.

At its two inputs, subtracter ST6 receives output 3, shifted by three positions to the left at the minuend input.

A subtracter ST7 multiplies the second coefficient (49) and the result is stored in register RG32. At its two inputs, ST7 receives register RG31 output, shifted by three positions at the minuend input.

A subtracter ST8 multiplies the third coefficient (91) and the result is stored in register RG33. ST8 subtracts RG31 output from register RG32 output shifted by one position to the left.

A subtracters ST9 multiplies the fourth coefficient (118) and the result is stored in register RG34. ST9 subtracts output 3 shifted by six positions to the left register RG33 output shifted by one position to the left.

Outputs of registers RG32, RG33 and RG34 are applied to the inputs of a 3-input multiplexer MX11, and are connected in turn to output 5; RG33 output is used twice.

In the ORM block, subtracter ST10 multiplies the datum on register RG2 output 4 (FIG. 1) for the first coefficient (7) in the left-hand column on Table 4, and the result is stored in register RG35.

At its two inputs, ST10 receives output 4 shifted by three positions to the left at the minuend input.

A subtracter ST12 multiplies the second coefficient (25) and the result is stored in register RG37. ST12 subtracts RG35 output from output 4 shifted by five positions to the left.

An adder SM12 multiplies the third coefficient (71), and the result is stored in register RG38. SM12 adds output 4 shifted by six positions to the left to register RG35 output.

An adder SM13 multiplies the fourth coefficient (106), and the result is stored in a register RG39. Adder SM13 adds RG35 output shifted by three positions to the left with register RG37 output shifted by one position to the left.

A subtracter ST11 multiplies the fifth coefficient (126), and register RG36 stores the result. At its two inputs, subtracter ST11 receives output 4, shifted by seven positions to the left at the minuend input, and by one position to the left at the subtrahend input.

Outputs of registers RG36, RG37, RG38, and RG39 are applied to the inputs of a 4-input multiplexer MX12, and connected in turn to output 6.

The embodiment shown in FIG. 5 calls for the use of a larger number of components (or of equivalent logic gates if integrated circuits are employed) than that of FIG. 4, but permits higher computing speeds and simplifies addressing by the ADR2 block.

The circuit shown in FIG. 1 may be used to compute the n-dimensional DCT transform with any n, and with particular reference to the case of greatest practical interest: n=1, 2, 3.

In the one-dimensional case, it was seen that the circuit as per FIG. 1 performs a series of calculations on an input sample vector.

In the 2- and 3-dimensional cases, on the other hand, it can be demonstrated that said operations are repeated 2N and 3N2 times respectively.

The circuit shown in FIG. 1 must thus be expanded to include memories for intermediate transform product accumulation and standard circuits for addressing said memories, which can also perform the functions of blocks MEM1 and ADR1 (FIG. 1).

The circuit covered by this patent application can be advantageously embodied as a VLSI circuit. Supposing a representation precision of 12 bits for each input vector $f(j)$ component and 8 bits for the matrix coefficients, the circuit's complexity can be evaluated for each of the variants described.

For ERM and ORM blocks embodied as shown in FIG. 2, the overall circuit requires around 3500 equivalent gates (for example, with HCMOS technology, each equivalent gate consists of four transistors), plus a $16 \times 24$ bit accumulation memory (MEM2 and MEM3 blocks, FIG. 1). This embodiment provides an execution time per each elementary operation of around 60 ns. For ERM and ORM embodiments as shown in FIG. 3, the overall structure requires around 5800 equivalent gates and an equal accumulation memory, with execution time per elementary operation of around 20 ns.

ERM and ORM embodiments as shown in FIGS. 3 and 4 require 2900 and 4000 equivalent gates respectively and an $8 \times 23$ bit accumulation memory; execution time per elementary operation are still 60 ns and 20 ns respectively.

Figure 6:
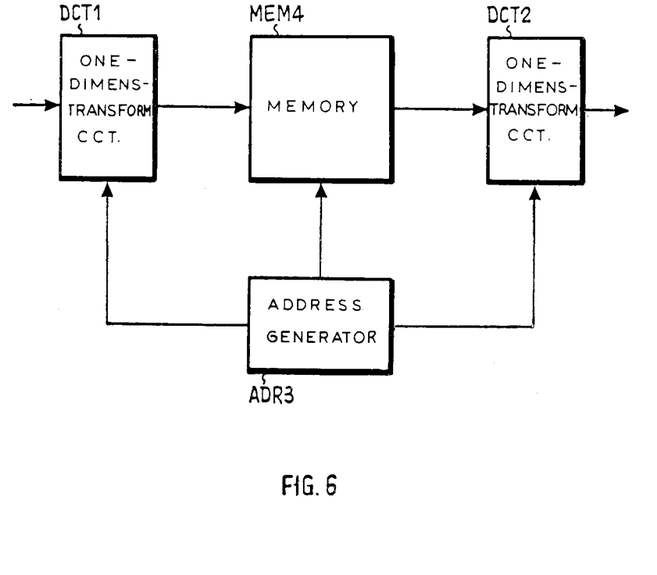
FIG. 6 shows an embodiment of the two-dimensional DCT transform computational circuit using two circuits as shown in FIG. 1.

FIG. 6 shows an embodiment of a two-dimensional DCT transform computational circuit. It consists of two cascade-connected one-dimensional DCT transform computation circuits (as shown in FIG. 1), indicated as DCT1 and DCT2, with an interposed memory MEM4 for temporary storage of intermediate result vectors $F(k)$. The ADR3 block generates read/write addresses for MEM4 and synchronizes address generators ADR1 and ADR2 (FIG. 1) for blocks DCT1 and DCT2. Memory MEM4 is matrix-structured so as to contain N vectors $F(k)$ of N components each, and is read in orthogonal way to the direction in which it is written (read by columns and written by lines or vice versa).

Embodying the circuit shown in FIG. 6 should not pose problems for technicians in the field, given the description of the circuit shown in FIG. 1.

I claim:

1. A circuit for computing a discrete cosine transform of $f(j)$ sample vectors of dimension $N (0 < j < N-1)$, said transform having a square matrix base of dimensions N.N with coefficients which repeat in absolute value at each column but whose order and sign can differ, said circuit obtaining transformed $F(k)$ sample vectors including vectors of dimension $N (0 < K < N-1)$, said circuit comprising two circuit branches working in parallel including a first circuit branch for operations relating to coefficients in even matrix lines and a second circuit branch for coefficients in odd matrix lines, said branches comprising:

a first adder and a first subtracter, belonging to the first and second branch respectively, which at inputs receive pairs of samples of an $F(j)$ vector having index (j) and (N−j−1), with j increasing sequentially from 0 to NR−1;

first and second calculating units, belonging to the first and second branch respectively, which, for each addition or subtraction result received respectively from said first adder or first subtracter, calculate NR partial products referring to the matrix column coefficients in even and odd lines respectively, with sequential order, among the coefficients of a column, fixed for all columns, so as to produce each partial product through an addition and shifting operation which involves the previous partial products or input datum;

a first and second adder/subtracter belonging respectively to the first and second branch, which add or subtract a partial product received from a second input to or from a datum received from a first input of first and second calculating units respectively, and finding the sum in the case of a partial product referring to a positive coefficient or the difference in the case of a negative coefficient;

first and second memories, belonging to the first and second branch respectively, accumulating NR partial results each, for accumulating calculations performed by said first and second adder/subtracters, said first memories accumulating partial results R* (2K) relating to even matrix column lines, said second memories accumulating partial result R* (2K+1) relating to odd lines, said partial results being components of a transformed sample vector F(k) at the NR−1 index columns;

first addressing units which generate: first control signals for said first and second calculating units, said first control signals determining said sequential order, among coefficients of a column, fixed for all columns; addresses to be read in said first and second memories for accumulation of said partial results, supplied as data to said first input of first and second adder/subtracter respectively, and for rewriting said data updated in the same position, said addresses having a sequence which varies with the matrix column, such as to identify the partial result R* (2k) and R* (2k+1) whose index identifies the matrix line containing the coefficient for which said first and second calculating units perform said partial products; operation selection signals for said first and second adder/subtracter.

2. A circuit as defined in claim 1 wherein for N=16 said first calculating units comprise:

a first and a second multiplexer which at a first input receive output of said first adder and at a second input receive output of a first register;

first and second shifting units which receive outputs of the first and second multiplexer respectively; and a third adder/subtracter which receives outputs of said first and second shifting units, for subtraction subtracting the output of the second shifting units from that of the first shifting units, and whose output supplies said first register and is the output of said first calculating unit; and wherein said second calculating units comprise:

a third and fourth multiplexers which at a first input receive output of said first subtracter, said third multiplexer receiving at a second input the output of a second register, said fourth multiplexer also receiving the outputs of a third and fourth register at a third and fourth input;

third and fourth shifting units which receive outputs of the third and fourth multiplexers respectively; and a fourth adder/subtracter which receives outputs of said third and fourth shifting units, for subtraction subtracting the output of the third shifting units from that of the fourth shifting units and whose output supplies said second, third and fourth registers and is the output of said second calculating units, said first, second, third and fourth registers being used for temporary storage of said previous partial products.

3. A circuit as defined in claim 2 wherein said first control signals generated by said first addressing units cause the following succession of operations to be performed by said first and second calculating units: for the first partial product, the first, second, third and fourth multiplexers are switched on the first input, the first, second, third and fourth shifting units shift respectively by four, one, zero and three positions to the left, in the direction of multiplications by powers of two, the third and fourth adder/subtracter find the sum, said first and second registers memorize the input datum; for the second partial product the first, second, third and fourth multiplexers are switched respectively on the second, first, second, first input, the first, second, third and fourth shifting units shift respectively by one, zero, one and three positions to the left, the third and fourth adder/subtracters find the sum and the difference respectively, said third register memorizes the input data; for the third partial product the first, second, third and fourth multiplexers are switched on the second, first, second and third input, the first, second, third and fourth shifting units shift by zero, five, zero and one positions to the left, the third adder/subtracter finds the sum and the fourth the difference, said first and fourth registers memorize the input data; for the fourth partial product the first, second and fourth multiplexers are switched on the first input, the third multiplexer on the second input, the first, second, third and fourth shifting units shift by five, five, three and one position to the left, the third adder/subtracter finds the sum and the fourth the difference; for the fifth partial product the first and second multiplexers are switched on the second input, the third and fourth on the first input, the first shifting units shift by one position to the right in the direction of division by multiples of two, the third and fourth shifting units shift by six and four positions to the left, the third and fourth adder/subtracters find the sum, the second register memorizes the input datum; for the sixth partial product the first, second, third and fourth multiplexers are switched on the second, first, second and third inputs, the first, second and fourth shifting units shift by one, four and one position to the left, the third shifting unit shifts by four positions to the right, the third adder/subtracter finds the difference and the fourth the sum; for the seventh partial product the first, second, third and fourth multiplexers are switched on the second, first and fourth inputs, the first shifting units shift by one position to the right, the second and fourth shifting units shift by six and one position to the left, the third and fourth adder/subtracters find the sum; and for the eighth partial product, the first, second and third multiplexers are switched on the first input, the fourth on the third input, the first, second and third shifting units shift by five, five and six positions to the left, the third and fourth adder/subtracters find the sum.

4. A circuit as defined in claim 2 wherein said shifting units consist of barrel shifters.

5. The circuit as defined in claim 1 wherein for N=16 said first and second calculating units include six and eight adders or subtracters respectively which produce an equal number of partial products through suitable justification of their two inputs, six and eighth registers which memorize the results thereof, and further register on input of said first circuit units and multiplexers which receive the outputs of said registers, said first control signals generated by said addressing units determining only the connection sequence of multiplexer inputs with outputs.

6. The circuit defined in claim 5 wherein said first calculating units make the following interconnection between said adders or subtracters, intercalated with said registers; to a second adder is applied the output or said first adder shifted to the left by one and four positions; to a third adder are brought the outputs of said first adder, shifted by five positions to the left, and of said second adder; to a second subtracter are brought the outputs of the second adder, shifted by one position to the left, and of the first adder; to a third subtracter are brought the outputs of the first adder, shifted by four positions to the left, and of the third adder, shifted by one position to the left; to a fourth adder are connected to the outputs of the first adder, shifted by six positions to the left, and of the third adder, shifted by one position to the right; to a fifth adder is applied the output of the third adder shifted by one position to the right at one input; said further register receives the output of the first adder shifted by six positions to the left; in addition, characterized in that said second circuit units feature the following interconnection between said adders and subtracters, intercalated with said registers: to a sixth and seventh adder is applied the output of the first subtracter respectively shifted by six and four positions to the left and by three and zero positions to the left; to an eighth adder are brought the outputs of the first subtracter, shifted by three positions to the left, and of the seventh adder, shifted by one position to the left; to a fourth subtracter are brought the outputs of the first subtracter, shifted by one position to the left, and of the seventh adder, shifted by three positions to the left; to a fifth subtracter are applied the outputs of the seventh adder and the eighth adder, shifted by one position to the left; to a ninth adder are brought the outputs of the first subtracter, shifted by six positions to the left, and of the eighth adder: to a tenth adder are applied the outputs of the sixth adder, shifted by four positions to the right and of the eighth adder, shifted by one position to the left; to an eleventh adder are brought the outputs of the first subtracter, and of the fifth subtracter, shifted by one position to the left; said output multiplexers connecting inputs to outputs in the following order: for the first partial product, the outputs of the second and seventh adder; for the second partial product, the outputs of the second subtracter and the eighth adder; for the third partial product, the outputs of the third adder and the fifth subtracter; for the fourth partial product, the outputs of the further register and the fourth subtracter; for the fifth partial product, the outputs of the fifth and sixth adder; for the sixth partial product, the outputs of the third subtracter and the tenth adder; for the seventh partial product, the outputs of the fourth and eleventh adder; and for the eighth partial product, the outputs of the further register and the ninth adder.

7. The circuit as defined in claim 1 wherein for N=8 said first calculating units include:
a fifth and a sixth multiplexer which receives at a first input output of said first adder, at a second input output of a fifth register; said sixth multiplexer receiving at a third input output of a sixth register shifted by one position to the left, and with the outputs applied to its first and second inputs shifted by three positions to the left;
fifth scaling units which receive output of the fifth multiplexer; and
a sixth subtracter which subtracts the output of the fifth shifting units from that of the sixth multiplexer, and whose output supplies said fifth and sixth registers and is the output of said first circuit units; and
said calculating units include:
a seventh and an eighth multiplexer which receive at a first input output of said first subtracter, and at a second input outputs of a seventh and an eight register respectively;
sixth and seventh shifting units which receive respectively the outputs of said seventh and eighth multiplexers; and
a sixth adder/subtracter which receives the outputs of said sixth and seventh shifting units, for subtraction subtracting the output of the sixth shifting units from that of the seventh, and whose output supplies and seventh and eighth registers and is the output of said second circuit units said fifth, sixth, seventh, eighth registers being used for temporary storage of said previous partial products.

8. The circuit defined in claim 7 wherein said first control signals generated by said addressing units cause the following succession of operations by said first and second calculating units: for the first partial product, the fifth, sixth, seventh and eighth multiplexers are switched on the first input, the fifth, sixth, and seventh shifting units shift by zero, zero and three positions to the left, and sixth adder/subtracter performs subtraction, the fifth and seventh registers memorize the input datum; for the second partial product, the fifth, sixth, seventh multiplexers are switched on the second input, the eighth multiplexer on the first input, the fifth, sixth and seventh shifting units shift by zero, zero and five positions, the sixth adder/subtracter performs subtraction, the sixth and eighth registers memorize the input datum; for the third partial product, the fifth, sixth, seventh and eighth multiplexers are switched respectively on the second, third, second and fifth inputs, the fifth, sixth and seventh shifting units shift by zero, zero and six positions to the left, the sixth adder/subtracter finds the sum; for the fourth partial product, the fifth, sixth, seventh and eighth multiplexers are switched respectively on the second, third, second and second inputs, the fifth, sixth and seventh shifting units shift by zero, three and one position to the left, the sixth adder/subtracter finds the sum, the seventh register memorizes the input datum and; for the fifth partial product, the fifth, sixth, seventh and eighth multiplexers are switched on the first, third, first and first input, the fifth, sixth and seventh shifting units shift by six, one and seven positions to the left, and the sixth adder/subtracter performs subtraction.

9. A circuit as defined in claim 7 wherein said first control signals generated by said first addressing units cause the following succession of operations to be performed by said first and second calculating units: for the first partial product, the first, second, third and fourth multiplexers are switched on the first input, the first, second, third and fourth shifting units shift respectively by four, one, zero and three positions to the left, in the direction of multiplications by powers of two, the third and fourth adder/subtracter find the sum, said first and second registers memorize the input datum; for the second partial product the first, second, third and fourth multiplexers are switched respectively on the second, first, second, first input, the first, second, third and fourth shifting units shift respectively by one, zero, one and three positions to the left, the third and fourth adder/subtracters find the sum and the difference respectively, said third register memorizes the input data; for the third partial product the first, second, third and fourth multiplexers are switched on the second, first, second and third input, the first, second, third and fourth shifting units shift by zero, five, zero and one positions to the left, the third adder/subtracter finds the sum and the fourth the difference, said first and fourth registers memorize the input data; for the fourth partial product the first, second and fourth multiplexers are switched on the first input, the third multiplexer on the second input, the first, second, third and fourth shifting units shift by five, five, three and one position to the left, the third adder/subtracter finds the sum and the fourth the difference; for the fifth partial product the first and second multiplexers are switched on the second input, the third and fourth on the first input, the first shifting units shift by one position to the right in the direction of division by multiples of two, the third and fourth shifting units shift by six and four positions to the left, the third and fourth adder/subtracter find the sum, the second register memorizes the input datum; for the sixth partial product the first, second, third and fourth multiplexers are switched on the second, first, second and third inputs, the first, second and fourth shifting units shift by one, four and one position to the left, the third shifting unit shifts by four positions to the right, the third adder/subtracter finds the difference and the fourth the sum; for the seventh partial product the first, second, third and fourth multiplexers are switched on the second, first and fourth inputs, the first shifting units shift by one position to the right, the second and fourth shifting units shift by six and one position to the left, the third and fourth adder/subtracters find the sum; and for the eighth partial product, the first, second and third multiplexers are switched on the first input, the fourth on the third input, the first, second and third shifting units shift by five, five and six positions to the left, the third and fourth adder/subtracters find the sum.

10. The circuit as defined in claim 1 wherein for N=8, said first and second calculating units include respectively four and five adders or subtracters which produce an equal number of partial products through suitable justification of their two inputs, four and five registers which memorize the results thereof, and an output multiplexer which receives the outputs of said registers, said first control signals generated by said addressing units determining only the connection sequence of multiplexer inputs with outputs.

11. The circuit defined in claim 10 wherein said first calculating units effect the following interconnection between said adders or subtracters, intercalated with said registers: to a seventh subtracter is applied the output of the first adder shifted by three positions to the left at one input; to an eighth subtracter is applied the output of the seventh subtracter shifted at an input by three positions; to a ninth subtracter are applied the outputs of the seventh subtracter, and of the eighth subtracter scaled by one position to the left; and to a tenth subtracter are brought the outputs of the first adder, shifted by six positions to the left, and of the ninth subtracter shifted by one position to the left; and wherein said second calculating units effect the following interconnection between said adders or subtracters, intercalated with said registers: to an eleventh and twelfth subtracter is applied the output of said first subtracter respectively shifted by three, zero, seven and one position to the left; to a thirteenth subtracter are applied the outputs of the first adder, shifted by five positions to the left, and the eleventh subtracter; to a twelfth adder are applied the outputs of the first subtracter, shifted by six positions to the left, and of the eleventh subtracter; to a thirteenth subtracter are applied the outputs of the eleventh subtracter shifted by three positions to the left, and of the thirteenth subtracter, shifted by one position to the left; said output multiplexer connecting inputs to outputs in the following order: for the first partial product, the outputs of the eighth and thirteenth subtracters; for the second partial product, the outputs of the ninth subtracter and the twelfth adder; for the third partial product, the outputs of the ninth subtracter and the thirteenth adder; and for the fourth partial product, the outputs of the tenth and twelfth subtracter.

12. A circuit as defined in claim 1 wherein said first addressing units supply to outside a data-ready (DR) signal at the beginning of the operations relating to the NR−1 index column; on the basis of said signal, the partial results R*(k) at the outputs of said first and second adder/subtracters are available at outputs as components of a transformed F(k) sample vector.

13. A circuit as defined in claim 1 wherein said first addressing units (ADR2) supply, at the end of calculations relating to the index NR−1 column, addresses to said first and second accumulation memories for sequential reading and forwarding to the outputs of R*(k) partial results, there memorized, as components of a transformed F(k) sample vector.

14. A circuit as defined in claim 1 wherein the data at the outputs of said first adder, first subtracter, first and second calculating units and first and second accumulation memories are synchronized by registers.

15. A circuit for computing the two-dimensional discrete cosine transform using a plurality of transform computing circuits as defined in claim 1 and which includes a first of said transform computing circuits followed by a matrix-structured intermediate memory and by a second of such circuits, and second addressing units for said intermediate memory which determine writing of N vectors of transformed F(k) samples, calculated by the first circuit, and reading in a direction orthogonal to that of writing, of N vectors of f(j) samples to be transformed, each consisting for the K-nth component of said F(k) vectors present in said intermediate memory, for forwarding to a second of said transform computing circuit.

* * * * *